Sept. 16, 1952 D. A. CARGILL 2,610,449
AUTOMATIC MILLING CUTTER GRINDER
Filed Nov. 6, 1948 3 Sheets—Sheet 2

Inventor
Don A. Cargill
By Spencer, Willits, Helmig v Caillie
Attorneys

Sept. 16, 1952  D. A. CARGILL  2,610,449
AUTOMATIC MILLING CUTTER GRINDER
Filed Nov. 6, 1948  3 Sheets-Sheet 3
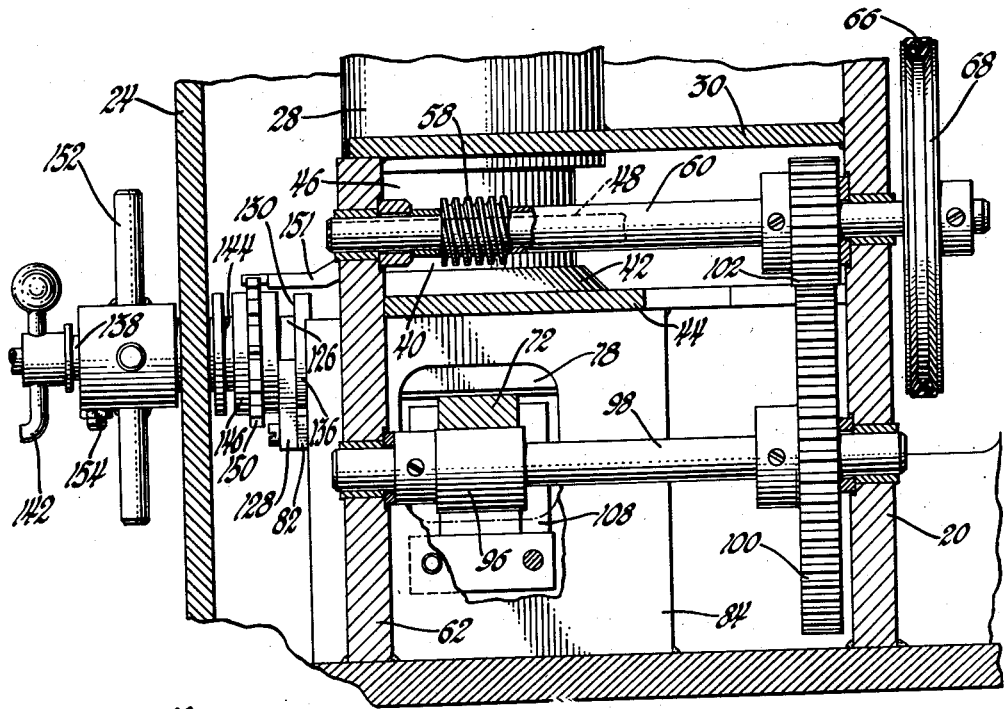
Fig. 4
Fig. 5
Fig. 6
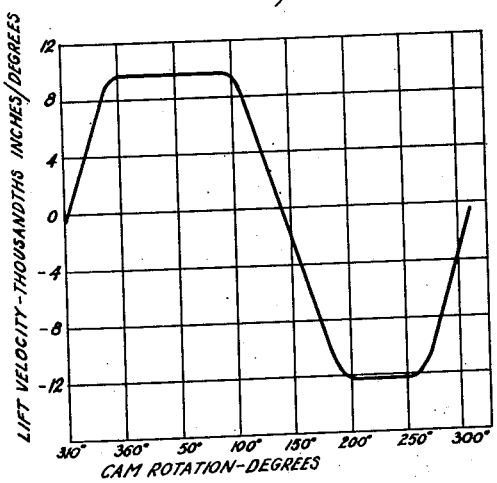
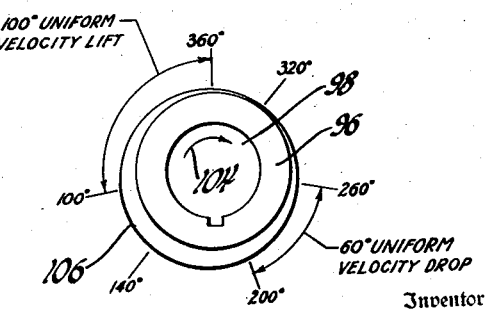
Inventor
Don A. Cargill
By
Spencer, Willits, Helwig & Baillie
Attorneys Patented Sept. 16, 1952

2,610,449

UNITED STATES PATENT OFFICE 2,610,449

AUTOMATIC MILLING CUTTER GRINDER

Don A. Cargill, Birmingham, Mich., assignor to General Motors Corporation, Detroit, Mich., a corporation of Delaware Application November 6, 1948, Serial No. 58,719

11 Claims. (Cl. 51—123)

This invention relates to grinding machines and particularly to a machine for successively grinding a plurality of circumferentially spaced and similarly inclined surfaces on a work piece, such as for example, the tooth faces on a face milling cutter.

It is the general object of the invention to provide such a machine with which such operations can be performed more accurately and rapidly than has been possible or practicable heretofore.

More specifically it is an object of the invention to provide a machine of cheap and simple construction which performs such operations with a surface grinding action and in which the work is automatically indexed and fed to the grinding wheel.

The means by which these and other objects and advantages are obtained is clearly described hereinafter, reference being made to the drawings, in which:

Figure 4 is an enlarged view of a portion of the machine taken from line 4—4 of Figure 1, with parts broken away and in section.

Figure 5 is an elevational view illustrating a tooth of a milling cutter being ground on the machine in various stages of its movement into and out of engagement with the grinding wheel.

Figure 6 shows an enlargement of the working surface contour of a rotary cam employed in the machine, and a lift velocity diagram thereof.

Figure 1:
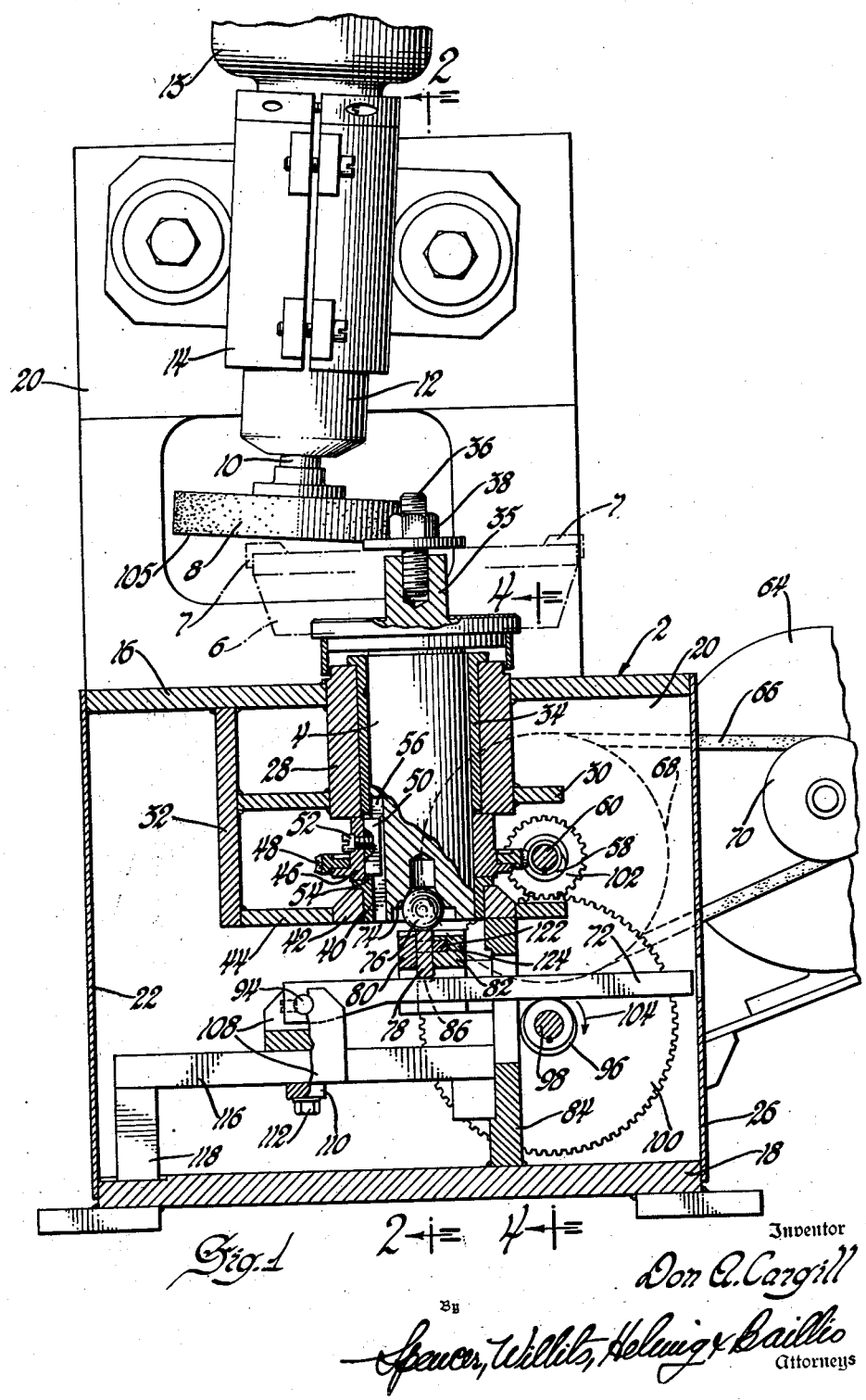
Figure 1 is an elevational view of a machine forming a specific embodiment of my invention, with parts broken away and in section and showing the outline of a milling cutter installed thereon for grinding.

Referring to the drawings, the machine comprises a stationary supporting structure or frame 2 in which is mounted a rotatably and reciprocably driven vertical spindle 4 adapted to carry a milling cutter 6 or other work piece into intermittent engagement with an abrading member such as a grinding wheel 8. The latter may, as shown, be directly driven by the spindle or shaft 10 of an electric motor 13 supported through its spindle bearing 12 and adjustably positioned and secured to the frame 2 by a clamp 14.

The frame 2 forms a box-like enclosure for the movable parts employed in controlling the movements of the spindle 4, and may be simply and inexpensively formed of top and bottom horizontal plates 16 and 18, welded or otherwise permanently secured to a vertical plate 20 which forms the back of the enclosure and extends above the same to provide a rigid mounting for the grinding wheel motor 13. Removable plates 22, 24 and 26 are provided to complete the remaining three sides of the enclosure.

The top plate 16 of the frame 2 has an aperture through which extends a cylindrical sleeve member 28 which is anchored at its upper end to the top plate 16 and anchored at its lower end to a horizontal brace member 30 which is anchored to the vertical plate 20 and is also tied to the top plate 16 by a vertical brace member 32. Lining the sleeve member 28 is an upper bushing 34 which journals the spindle 4.

The upper end of the spindle 4 is provided with a reduced diameter portion 35 having means such as the stud 36 and nut 38 for coaxially securing a work piece such as a milling cutter 6 having cutting teeth 7.

Spaced below the sleeve member 28 and in alignment with the upper bushing 34 therein is a lower bushing 40 fixedly supported in a ring member 42 which is anchored by a second horizontal brace member 44 to the vertical plate 20 and vertical brace member 32. The upper end of the lower bushing 40 is flanged outwardly and provides a thrust bearing surface for a rotatively movable ring 46 disposed coaxially of the spindle 4 and having a worm wheel 48 removably secured thereto as by screws 49 and 51. The spindle 4 is freely slidable longitudinally through the movable ring 46 but is locked against relative rotation therewith by the key 50 which is secured by the screw 52 in a recess 54 in the bore of the ring 46 and projects into a long groove 56 on the exterior of the spindle 4.

In mesh with the worm wheel 48 is a worm 58 on a shaft 60 journaled in the vertical plate 20 and in a bearing support plate 62 which is anchored to the bottom plate 18 and to the two horizontal brace members 30 and 44. The shaft 60, as shown, extends through the vertical plate 20 and is drivably connected to a motor 64, as by the belt 66 running over pulleys 68 and 70.

Figure 2:
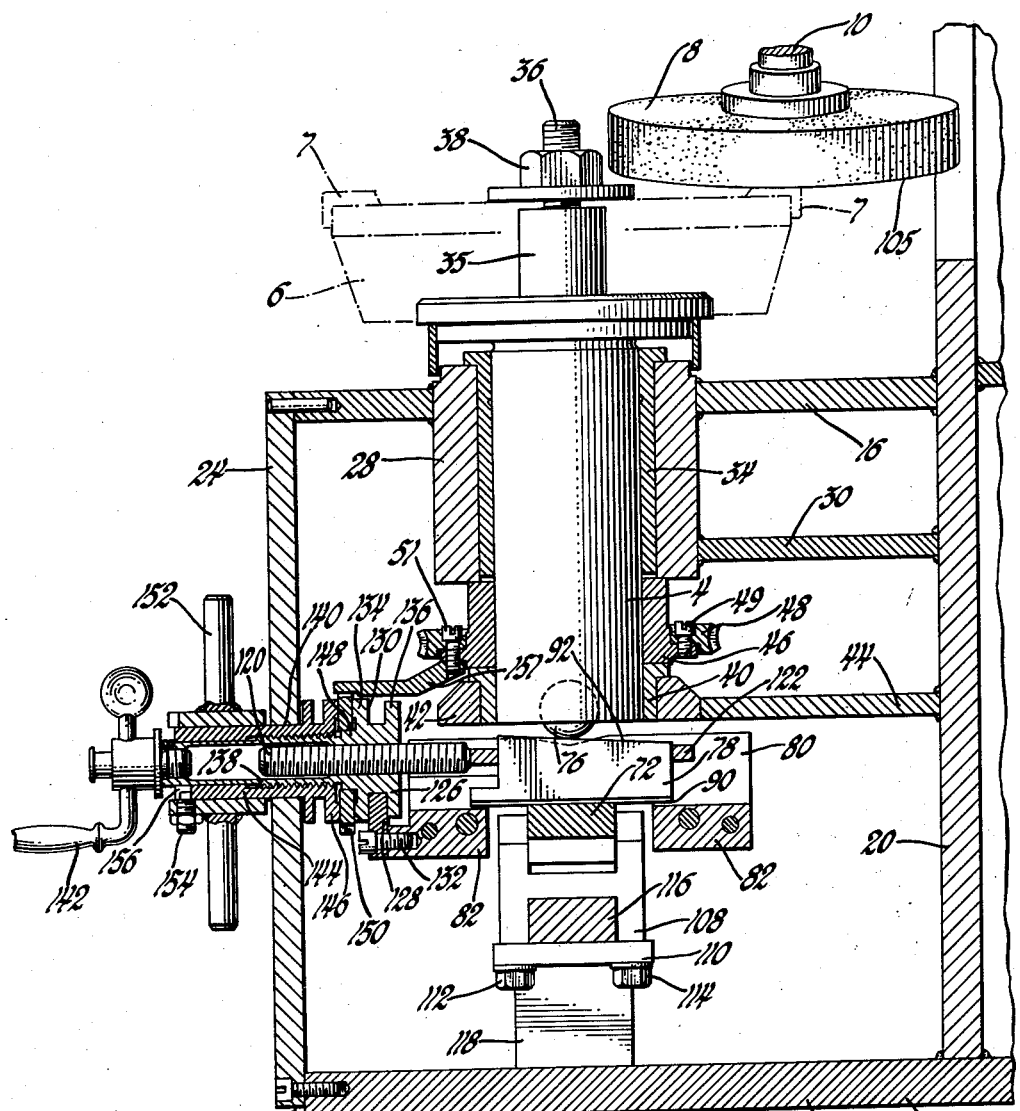
Figure 2 is an enlarged view of a portion of the machine taken from line 2—2 of Figure 1, with parts broken away and in section.
Figure 3:
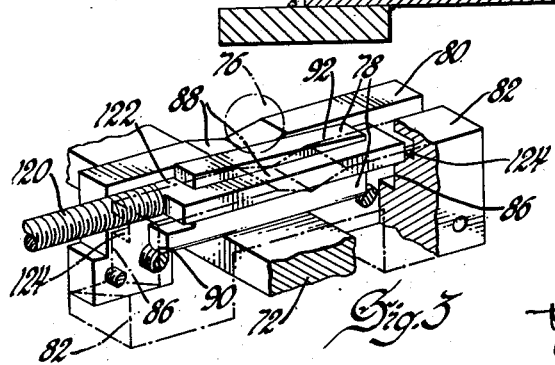
Figure 3 is an enlarged fragmentary view in perspective showing certain details of the machine's work feeding mechanism.

The spindle 4 is vertically supported by a lever 72 disposed transversely of the spindle axis below the lower end of the spindle. The bottom end of the spindle 4 is provided centrally thereof with a conical recess or socket 74 to receive a ball 76 which rests on a variable thickness spacer member such as the wedge 78, which in turn rests on the lever 72. The wedge 78 extends transversely of the lever 72 and is laterally supported thereon by two guide blocks 80 and 82, most clearly shown in Figure 3, which are fixedly secured to the frame 2 through a vertical brace member 84 extending from the ring member 42 to the bottom plate 18. The wedge 78 is slidable transversely of the lever 72 and also vertically in a groove 86 formed by an upwardly open recess in the side of the guide block 82 adjacent the guide block 80. The groove 86 is of sufficient depth both to provide ample lateral support for the wedge 78 when the lever 72 is in its uppermost operative position, and to prevent the wedge from bottoming therein when the lever is in its lowermost position. The top faces of the guide blocks 80 and 82 may be relieved or notched as shown at 88 in Figure 3, to prevent their interfering with the ball 76 when the lever is in its lowermost position. As best shown in Figures 2 and 3, the bottom face 90 of the wedge 78 is rounded to provide approximately line contact with the lever 72, and the top face 92 on which the ball 76 rests is inclined in a direction longitudinally of the wedge to provide for variably adjusting the height of the spindle relative to the lever 72. Moving the wedge 78 to the right as viewed in Figure 2 operates to raise the reciprocatory stroke of the spindle and thereby feed the milling cutter 6 (or other work) to the grinding wheel 8.

The lever 72 is fulcrumed at one end on a pin 94 for oscillatory movement in a plane through the longitudinal axis of the spindle 4 in response to movements of a single lobed rotary cam 96 upon which its opposite end rests and which is drivably carried on a camshaft 98 journaled in the plates 20 and 62. Camshaft 98 and shaft 60 are positively geared together, as by intermeshing gears 100 and 102 removably fixed thereto respectively, at a drive ratio such that camshaft 98 makes the same number of revolutions per each revolution of the spindle 4 as the number of teeth on the milling cutter 6 being ground. When milling cutters having greater or lesser numbers of teeth are to be ground, the gearing together of camshaft 98 and shaft 60 must be changed accordingly, in order that the same relationship is maintained between the number of cutter teeth and the speed of the camshaft. In the case of the particular machine shown, such a change in gearing is accomplished by removing gears 100 and 102 from their respective shafts and substituting other gears (not shown) providing the required driving ratio.

The cam 96 is designed to operate in the direction of the arrow 104. As shown in Figure 6, a contour for the working surface 106 which has proved entirely satisfactory consists of successively adjacent sections blended together and providing respectively 40° of uniform acceleration lift (320°–360°), 100° of uniform velocity lift (360°–100°), 40° of uniform deceleration lift (100°–140°), 60° of uniform acceleration drop (140°–200°), 60° of uniform velocity drop (200°–260°), and 60° of uniform deceleration drop. While various other contours might be employed for the working surface 106, that which is illustrated and just described has two advantageous features which are preferably to be retained in any modification thereof, namely, a single lobe, and a uniform velocity lift section. A single lobe cam insures equal lift of the spindle 4 (through the lever 72) for each tooth of the milling cutter being ground, thereby eliminating the cam from any possible contribution to milling cutter run-out (variation in height between respective teeth) during grinding. And the uniform velocity lift section of the working face 106 synchronizes the rate of lift of the spindle 4 with the rate of rotation of the spindle, and causes the various teeth 7 of the milling cutter 6 being ground to move in respective parallel planes during that portion of each revolution of the cam 96. Figure 5 illustrates the progressive movement of a milling cutter tooth 7 as it is brought into and out of engagement with the working face 105 of the grinding wheel 8, the line 107 representing the plane within which that portion of the movement occurs while the constant velocity lift section of the cam working face 106 is in operation.

The maximum lift height of the cam working face 106, which with the contour illustrated in Figure 6 occurs at the 140° position, may be chosen in accordance with the size of the milling cutters intended to be ground on the machine. For grinding the standard range of face milling cutters used in machining automotive crankcases, cylinder heads, and the like, a maximum lift height of approximately ⅛ of an inch was found to be satisfactory in the machine shown.

The pin 94 which serves as the fulcrum for the lever 72 is mounted in a bracket 108 which is releasably clamped, as by a plate 110 and bolts 112 and 114, to a horizontal rail 116 fixedly secured to the frame 2 through the vertical brace member 84 and a pedestal 118. The location of the bracket 108 along the rail 116 determines the distance of the fulcrum pin 94 from the spindle 4 and cam 96, and thus the effective length of the lever 72, which in turn determines the length of stroke of the spindle 4 effected by the cam 96. And, since the cam 96 is geared to the rotation of the spindle 4, the length of the stroke of the spindle determines the speed of its reciprocatory movement. Further, since the rate of lift of the spindle is synchronized with its speed of rotation during the portion of the stroke when the uniform velocity lift section of the cam 96 is in service, by increasing or decreasing the reciprocatory stroke an adjustment is obtained of the inclination, relative to the spindle axis, of the parallel planes through which the milling cutter teeth move during that portion of the stroke.

An externally threaded lead screw 120, having a C-shaped extension 122 slidably supported in a groove 124 between the guide blocks 80 and 82, is provided for movably adjusting the location of the wedge 78 transversely of the lever 72. The extension 122 embraces opposite ends and one side of the wedge 78, as shown in Figure 3, the wedge being free to move vertically relative thereto in response to the oscillatory movements of the lever 72. Threadedly engaging the lead screw 120 is a circular nut 126 which is free to rotate thereon but is anchored longitudinally thereof by a finger member 128 engaging a peripheral groove 130 therein and fixedly secured as by the screw 132 to the stationary guide block 82. The nut 126 has outwardly extending flange portions 134 and 136 defining the groove 130 and an externally threaded reduced diameter portion 138 extending coaxially thereof through an aperture 140 in the removable front plate 24 of the frame 2. A crank 142 is connected to the reduced diameter portion 138 for manually turning the nut 126. Threadedly engaging the reduced diameter portion 138 of the nut 126 is an internally threaded lock nut 144 journaled in the aperture 140 and having an outwardly extending flange portion 146 disposed opposite the flange portion 134 of the nut 126. Between the flange portions 146 and 134 and journaled on a shoulder 148 on the nut 126 is a peripherally toothed member or star wheel 150 which is adapted to be rotated in step-by-step fashion with each successive rotation of the spindle 4 by an arm 151 fixed to the movable ring 46 as by the screw 51. A hand wheel 152, journaled on the lock nut 144 and slidable longitudinally thereof, is provided with a set screw 154 which can be releasably brought into engagement with a slot 156 in the lock nut whenever it is desired to rotate the latter in order to effect a clutching engagement or disengagement of the star wheel 150 with respect to the nut 126. When the star wheel 150 is frictionally clutched between the respective flange portions 134 and 146 of the nuts 126 and 144, the nut rotates a predetermined increment at the beginning (or end) of each revolution of the spindle 4, which in turn, effects an incremental axial movement of the lead screw 120 and a resultant incremental raising of the reciprocatory stroke of the spindle.

The operation of the machine, although believed to be already apparent from the description heretofore given of the functions of its various elements, will now be summarized. A milling cutter 6 or other work-piece having projections in the nature of cutter teeth 7 to be ground is first placed on the upper end of the spindle 4 and clamped securely by the nut 38. By adjustment of the clamp 14 relative to the frame back member 20 the grinding wheel 8 is positioned over the work, such that the wheel working face 105 is inclined from the horizontal by the amount of the clearance angle with which it is desired to provide the cutter teeth 7, and such that the peripheral edge of the wheel working face 105 is approximately tangent to a vertical plane through one of the cutter teeth when the spindle 4 is at the middle of its reciprocatory stroke. Rotation of the shaft 60, by means of the motor 64 connected thereto through the pulleys 68, 70 and belt 66, effects a rotation of the spindle 4 through the worm 58 and worm wheel 48. Shaft 98 rotates concurrently with shaft 60, being geared thereto by gears 100 and 102 which it will be assumed have been selected to provide the proper drive ratio, at a speed equal to the rotative speed of the spindle 4 times the number of teeth 7 on the milling cutter 6 which is to be ground. Any deviation from this drive ratio must be corrected by changing gears 100 and 102 for other gears which will provide the same. The cam 96 being drivably carried by the shaft 98 will therefore rotate and effect an oscillatory movement of the lever 72 about its fulcrum pin 94, which movement will be transmitted or converted into a vertical reciprocatory movement of the wedge 78, ball 76 and spindle 4 as a unit. Reciprocation of the spindle concurrently with its rotation is permitted by the extended length of the groove 56 which allows it to slide relative to the key 50 affixed to the worm wheel 48.

Due to the contour of the working face 106 of the cam 96 (see Figure 6), the spindle 4 in rising from its lowermost to its uppermost position moves first at a uniformly increasing velocity for a limited distance, then at a constant velocity for an extended distance, and finally slows with uniformly decreasing velocity of movement as it approaches its uppermost position. Its upward movement at constant velocity is substantially synchronized with its rotative movement by reason of the gearing together of the two shafts 60 and 98 (the slight distortive effect produced by the pivoting of lever 72 being neglectable in view of the small amplitude of lift involved), with the result that the upper face of each cutting tooth 7 moves in a continuous plane, represented by the line 107 in Figure 5, during that period. The inclination of this plane relative to the horizontal depends on the effective length of the lever 72, which is adjusted by shifting the fulcrum pin supporting bracket 108 along the rail 116 either toward or away from the cam 96. With the bracket 108 located the proper distance from the cam, the plane referred to will be parallel with the plane of the working face 105 of the grinding wheel 8.

Since the spindle 4 must reciprocate the same number of times per revolution thereof as there are teeth 7 or like portions to be ground on the work piece, and since such number of reciprocations per revolution directly affects the speed of its axial movement independently of its rotary movement, the proper location of the bracket 108 on the rail 116 to obtain a desired angle of grind will need to be varied to accommodate work pieces having such different numbers of teeth. As a convenience, in facilitating the proper location of the bracket 108, markings or other reference points (not shown) may be placed on the rail 116 to indicate the positions corresponding to the most commonly used combinations of desired clearance angles and cutter teeth numbers.

Prior to the positioning of the grinding wheel 8 by adjustment of the clamp 14, as earlier referred to, the lead screw 120 is backed out by rotating the hand crank 142 to withdraw the wedge 78 a sufficient distance to the left, as viewed in Figure 2, so that the ball 76 rests thereon near the lower end of its inclined top face 92.

The motors 13 and 64 are then started and the hand crank 142 is rotated to raise the reciprocatory stroke of the spindle until the upper faces of the cutter teeth just miss contacting the grinding wheel as they successively rotate thereunder at the upper end of the spindle stroke. Hand wheel 152 is then interlocked with the lock nut 144 and the latter is threaded up on the nut 126 to clamp them into frictional engagement with the star wheel 150 which is intermittently rotated by the arm 151 rotating with the spindle. Once each revolution thereafter the arm 151 engages the star wheel 150 and rotates the same one tooth, rotating the nut 126 by the same degree and effecting an incremental advance of the lead screw 120 and wedge 78 toward the spindle, which in turn raises the reciprocatory stroke of the spindle and feeds the milling cutter 6 or other work piece a definite amount toward the grinding wheel 8.

Since the cutter teeth 7 successively engage the working face 105 of the grinding wheel while moving in a plane parallel thereto, a surface grinding action is obtained. Such a grinding action, as is well known, has important advantages over a plunge type grind in accuracy and quality of the finished work, grinding wheel life, etc.; and its achievement in a simply constructed machine providing automatic indexing and feeding of the work is one of the principal advantages obtained by my invention.

It is also pointed out that by reason of the instant machine employing a single lobed cam to effect the reciprocation of the work piece, each tooth or other portion of the latter being ground is advanced the same distance into contact with the grinding wheel, resulting in the complete avoidance of tooth run-out from a practical standpoint. Further, the use of a single lobed cam arranged with a pivoted lever follower adjustable in effective length, all in accordance with this invention, enables the machine to accommodate milling cutters or like work pieces of a variety of sizes and types.

The specific form and construction of the machine as shown in the drawings and described herein was chosen with the view of building a single machine or very small number thereof at a minimum cost, and it is appreciated that various structural modifications and refinements will readily suggest themselves to persons skilled in this art.

I wish to further point out that the terms and expressions used herein are to be considered in their descriptive rather than their limiting sense, and that the scope of my invention is defined solely by the appended claims.

I claim:

1. In a machine for surface grinding milling cutters and the like, a grinding wheel, supporting means for said wheel, a spindle for carrying a milling cutter into contact with the wheel, means supporting said spindle for rotary and reciprocatory movement, means for rotating the spindle at a uniform velocity, means for reciprocating the spindle toward and away from the wheel once for each tooth of the cutter during each revolution of the spindle, including a cam having a working face provided with a uniform velocity lift section operative during the advance stroke of the spindle, a lever actuated by the cam and operatively engaging the spindle for transmitting the movement of the cam to the spindle, a fulcrum supporting said lever, and means for adjusting the fulcrum of the lever to vary the length of stroke and thus the reciprocatory speed of the spindle.

2. In a surface grinding machine for multi-toothed face milling cutters and the like, a grinding wheel, supporting means for said wheel, a spindle for carrying a milling cutter, means supporting said spindle for rotary and reciprocatory movement, means for rotating the spindle at a uniform velocity, means for reciprocating the spindle toward and away from the wheel once for each tooth on the cutter during each revolution of the spindle, including a cam having a working face provided with a uniform velocity lift section operative in cooperation with the uniform speed of rotation of the spindle to cause the face of each successive cutter tooth to move in a continuous plane during its engagement with the grinding wheel, and a lever operatively connecting the spindle to the cam for transmitting the movement of the cam to the spindle at a ratio such that said plane extends parallel with the working surface of the grinding wheel, said lever having a supporting fulcrum on said spindle supporting means.

3. In a milling cutter grinding machine, a rotatably and reciprocably movable spindle having means adjacent one end for coaxially securing a milling cutter, means rotatably supporting said spindle and guiding its reciprocatory movement, a grinding wheel having a generally flat grinding face opposite said spindle end and tilted from a position normal thereto by the amount of the clearance angle with which it is desired to grind the faces of the cutter teeth, supporting means for said grinding wheel, means for rotating the spindle at a uniform velocity and means for longitudinally reciprocating the spindle the same number of times per revolution thereof as the number of teeth on the cutter, said reciprocating means including a uniform velocity lift cam operative through a pivotally supported follower against the opposite end of the spindle lever to effect a uniform lineal velocity of the spindle during its advancement toward the grinding wheel, said lever having its pivotal support on said spindle supporting means the effective length of said follower lever being adjustable to coordinate the lineal and rotary velocities of the spindle in order that successive teeth on the cutter engage the grinding wheel in the plane of its face.

4. In a milling cutter grinding machine, a spindle on which a grinding wheel may be mounted, a spindle on which a milling cutter may be mounted, supporting means for said spindles, means for rotating the milling cutter spindle at a uniform velocity, means for longitudinally reciprocating the milling cutter spindle at a frequency whose ratio to the angular velocity of the milling cutter spindle is equal to the number of teeth on the milling cutter, including a cam having a working face provided with a uniform velocity lift section operative during the engagement of each successive tooth of the cutter with the grinding wheel, a lever connected to the milling cutter spindle for transmitting the movement of the cam to the milling cutter spindle, said lever being fulcrumed at one end and having its free end engaged by the cam, and means for adjusting the fulcrum of the lever to vary the reciprocatory stroke of the milling cutter spindle and thereby regulate the speed at which the teeth of the milling cutter are fed to the grinding wheel, the fulcrum for said lever being supported by said spindle supporting means.

5. In a grinding machine for sharpening the teeth of milling cutters, a machine frame, a vertical spindle rotatably and reciprocably supported therein and provided with means at its upper end for coaxially securing a milling cutter to be sharpened, a worm wheel thrustably supported by the frame and having a coaxially slidable and rotary driving engagement with the spindle below the milling cutter, driving means including a first shaft journaled in the frame and carrying a worm in mesh with the worm wheel, a rotary cam for effecting reciprocation of the spindle, a second shaft in coaxial driving engagement with the cam and geared to the first shaft, a cam follower disposed transversely of the spindle and pivoted to the frame about a horizontal axis offset from the axis of the spindle, a variable height spacer member resting on the follower and vertically supporting the spindle thereon, and screw means geared to the rotation of the spindle for slidably moving the spacer member a predetermined distance relative to the follower at the end of each revolution of the spindle.

6. An automatically self-indexing milling cutter grinding machine, comprising a work spindle, a support journalling and reciprocably guiding said spindle, means for imparting a continuous axial rotation to the spindle, a single lobe cam on said support geared to said means and adapted to impart a concurrent longitudinal reciprocation to the spindle, means for longitudinally shifting the reciprocatory stroke of the spindle, and an abrasive member mounted on said support relative to the longitudinal and rotational movements of the spindle for contacting successive teeth of the cutter with each reciprocation of the spindle.

7. An automatic milling cutter grinding machine, comprising a rotatable and reciprocable spindle having means adjacent one of its ends for attaching a milling cutter, a support journalling and reciprocably guiding said spindle, an abrasive member on said support, driving means for continuously rotating the spindle, and means including a single lobed cam geared to said driving means and a pivoted follower in operative engagement with the cam for effecting a reciprocation of the spindle in timed relation with its rotation, said cam and follower being mounted on said support.

8. An automatic milling cutter grinding machine, comprising a rotatable and reciprocable spindle for carrying a milling cutter to be ground, a support journalling and reciprocably guiding said spindle, an abrasive member on said support, driving means for the spindle, gearing operable from said driving means to effect a continuous rotation of the spindle, other gearing including a constant velocity lift cam mounted on said support and operable from said driving means to effect a continuous reciprocation of the spindle.

9. In a machine for surface grinding milling cutters and the like, a grinding wheel, a spindle for carrying a milling cutter into contact with the wheel, means for rotating the spindle at a uniform velocity, means for reciprocating the spindle toward and away from the wheel once for each tooth of the cutter during each revolution of the spindle including a cam having a work face provided with a uniform velocity lift section operative during the advance stroke of the spindle and a lever actuated by the cam and operatively engaging the spindle for transmitting the movement of the cam to the spindle, and a variable height spacer member slidably resting on the lever and vertically supporting the spindle thereon, and means for shifting said spacer member transversely of the spindle to shift the reciprocatory stroke of the spindle longitudinally of the spindle axis.

10. In a grinding machine for grinding milling cutters and the like, a rotatable and reciprocable spindle for mounting the milling cutter to be ground, a first gear in coaxial driving engagement with the spindle, a second gear in mesh with the first gear, a first shaft in coaxial driving engagement with the second gear, a rotary cam, a second shaft in coaxial driving engagement with the cam, a gear train drivingly interconnecting the first and second shafts, a lever having a free end slidably resting on the cam and a fixed fulcrum laterally distant from both the cam and the spindle, a wedge member slidably spacing an end of the spindle from the lever, a screw-thread means interconnecting the wedge member and said first gear for effecting endwise movement of the wedge member transversely of the spindle, and means supporting each of the aforesaid elements for their relative movements as defined.

11. In an automatic milling cutter grinding machine, a rotatable and reciprocable spindle having means adjacent one of its ends for attaching a milling cutter, driving means for continuously rotating the spindle, and means including a single-lobed cam geared to said driving means and a pivoted follower operatively disposed between the cam and the opposite end of the spindle for transmitting movement of the cam to the spindle, a variable thickness spacer means slidably interposed between the lever and said spindle opposite end, and means rotatively geared to the spindle for shifting said spacer means transversely of the spindle at the end of each complete revolution of the spindle, and means supporting each of the aforesaid elements for their relative movements as defined.

DON A. CARGILL.

REFERENCES CITED

The following references are of record in the file of this patent:

UNITED STATES PATENTS

| Number | Name | Date |
| --- | --- | --- |
| 1,285,124 | Gleason | Nov. 19, 1918 |
| 1,326,462 | Murch | Dec. 30, 1919 |
| 1,841,244 | Gstyr | Jan. 12, 1932 |
| 2,108,310 | Griffing | Feb. 15, 1938 |
| 2,332,420 | Wildhaber | Oct. 19, 1943 |
| 2,452,989 | Brown | Nov. 2, 1948 |